(12) United States Patent
Nardi et al.

(10) Patent No.: US 7,896,594 B2
(45) Date of Patent: Mar. 1, 2011

(54) SELF-DRILLING MASONRY BOLT

(76) Inventors: Domenico Nardi, Leeton (AU); Michael Valenzisi, Leeton (AU)

( * ) Notice: Subject to any disclaimer, the term of this patent is extended or adjusted under 35 U.S.C. 154(b) by 239 days.

(21) Appl. No.: 12/282,642

(22) PCT Filed: Mar. 13, 2007

(86) PCT No.: PCT/AU2007/000304

§ 371 (c)(1),
(2), (4) Date: Sep. 11, 2008

(87) PCT Pub. No.: WO2007/104094

PCT Pub. Date: Sep. 20, 2007

(65) Prior Publication Data

US 2010/0034611 A1   Feb. 11, 2010

(30) Foreign Application Priority Data

Mar. 13, 2006 (AU) .............................. 2006901249
Feb. 15, 2007 (AU) .............................. 2007900754

(51) Int. Cl.
*F16B 13/04* (2006.01)
(52) U.S. Cl. .......................... 411/29; 411/46; 411/60.1
(58) Field of Classification Search ............. 411/27–29, 411/46, 49, 57.1, 60.1, 60.2, 62, 80.5
See application file for complete search history.

(56) References Cited

U.S. PATENT DOCUMENTS

| | | | | |
|---|---|---|---|---|
| 2,034,494 A * | 3/1936 | Stoll | ........................... | 411/147 |
| 2,914,983 A * | 12/1959 | Kopf et al. | ..................... | 411/29 |
| 3,316,796 A * | 5/1967 | Young | ........................... | 411/29 |
| 4,026,186 A | 5/1977 | Williams et al. | | |
| 4,173,918 A * | 11/1979 | Piersall | .......................... | 411/51 |
| 4,883,395 A * | 11/1989 | Klaric | ........................... | 411/55 |
| 5,183,387 A * | 2/1993 | Huggett et al. | .............. | 416/147 |
| 5,246,323 A * | 9/1993 | Vernet et al. | ................... | 411/29 |
| 5,820,321 A * | 10/1998 | Gruber | ......................... | 411/36 |
| 6,065,918 A * | 5/2000 | Adams | ......................... | 411/29 |
| 6,164,884 A * | 12/2000 | Mayr | ........................... | 411/36 |
| 6,712,544 B2 * | 3/2004 | Kruger et al. | ............. | 403/408.1 |
| 6,935,821 B2 * | 8/2005 | Bodin et al. | ................... | 411/29 |
| 6,942,439 B2 * | 9/2005 | Rouger | ......................... | 411/61 |

FOREIGN PATENT DOCUMENTS

| | | |
|---|---|---|
| AU | 2005204302 | 4/2006 |
| EP | 1072802 | 1/2001 |
| GB | 2254392 | 10/1992 |
| WO | WO 1997/049929 | 12/1997 |

* cited by examiner

*Primary Examiner*—Gary Estremsky
(74) *Attorney, Agent, or Firm*—Letham Law Firm LLC; Lawrence Letham

(57) ABSTRACT

A self-drilling masonry bolt including a body portion having a bolt member and an outer sleeve portion, a head portion and a drilling tip whereby, the self-drilling masonry bolt provides a simple and effective means for securing an item to cement, wood or any other suitable material without the requirement of multiple tools.

20 Claims, 2 Drawing Sheets

SELF-DRILLING MASONRY BOLT

FIELD OF THE INVENTION

This invention relates to building products and accessories, and in particular, to a self-drilling masonry bolt which provides a simple and effective means for securing an item to cement and/or wood without the requirement of multiple tools.

Whilst the invention may be applied to any fastening means for securing a building item to a material/structure such as a screw or the like and/or any suitable building application, for convenience sake it shall be described herein in terms of a self-drilling masonry bolt.

BACKGROUND TO THE INVENTION

Conventionally, the building industry has adopted one of two products for securing materials to a support and/or each other namely, screws or bolts. The type of product adopted is generally dependent on the materials being used. Accordingly, there are also provided numerous styles of screws and bolts which are better suited to particular materials and/or applications to simplify labour and time during construction.

Typically bolts, also referred to as anchors, are utilised in relation to masonry products. The disadvantage with these conventional masonry anchors is that they require pre-drilled holes of a correct depth and diameter prior to insertion of the anchor. Therefore, the procedure is quite time-consuming as it requires more than one step, and often more than one tool, to complete the job.

Accordingly, it is an object of the present invention to overcome or substantially ameliorate the disadvantages of the prior art by providing a self-drilling masonry bolt which provides a simple and effective means for securing an item to cement and/or wood without the requirement of multiple tools.

SUMMARY OF THE INVENTION

The present invention provides a self-drilling masonry bolt including:

a body portion having a bolt member and an outer sleeve portion;

a head portion;

and a drilling tip whereby the self-drilling masonry bolt provides a simple and effective means for securing an item to cement, wood or any other suitable material without the requirement of multiple tools or steps.

The self-drilling masonry bolt is preferably adapted to be made of a metal material which is strong, durable and resistant to corrosion.

The sleeve portion is preferably in the form of a hollow circular expansion sleeve which is adapted to expand and secure/anchor the bolt within a drilled hole and/or material. The diameter of the sleeve portion is preferably adapted to be slightly larger than the diameter of the threaded bolt so that the sleeve portion can be positioned over and receive the threaded bolt therethrough.

Preferably, the sleeve portion is provided with at least one split which is adapted to enable the sleeve portion to expand. The split is preferably similar in shape to a keyhole having a circular aperture at the top of the split with split extending downwardly to the bottom edge of the sleeve portion, and the split tapering outwardly at the bottom end of the sleeve portion.

The sleeve portion preferably has at least one helical rotor/radial cut-out portion which is adapted to curve partially around the circumference of the sleeve portion and operate to clean and pull debris out of the hole during drilling.

Preferably, the bolt member includes a shank, a head portion and a drilling tip. The bolt is preferably tapered so that the lower end of the bolt is preferably larger in diameter than the upper end. The upper end of the bolt member is adapted to have a threaded portion wherein the threaded portion has provided a left-handed thread for use with a reverse gear drill.

The threaded portion preferably has provided at least one aperture. A first aperture is adapted to extend horizontally through the entire width of the shank of the bolt member and a second aperture is adapted to be provided on one side of the threaded bolt and only extend through one side of the threaded bolt.

The head portion preferably comprises a nut and a washer which are adapted to be joined together. The underside of the washer is preferably pleated.

The self-drilling masonry bolt further includes at least one pin member. A first pin member or the like is preferably adapted to be passed through an aperture in the threaded portion of the bolt member so that either end of the pin member protrudes outwardly on either side of the bolt. A second pin-like member is preferably provided on the upper portion of the body portion of the bolt and is adapted to be integrally formed with the sleeve portion and bend inwardly into the centre of the sleeve portion.

Preferably, the drilling tip is adapted to be integrally formed with the lower thicker end of the bolt member wherein the drilling tip has a profile suitable for drilling through masonry materials.

In order that the invention may be more readily understood we will describe by way of non-limiting example of a specific embodiment thereof.

BRIEF DESCRIPTION OF THE DRAWING FIGURES

DESCRIPTION OF A PREFERRED EMBODIMENT OF THE INVENTION

Figure 1:
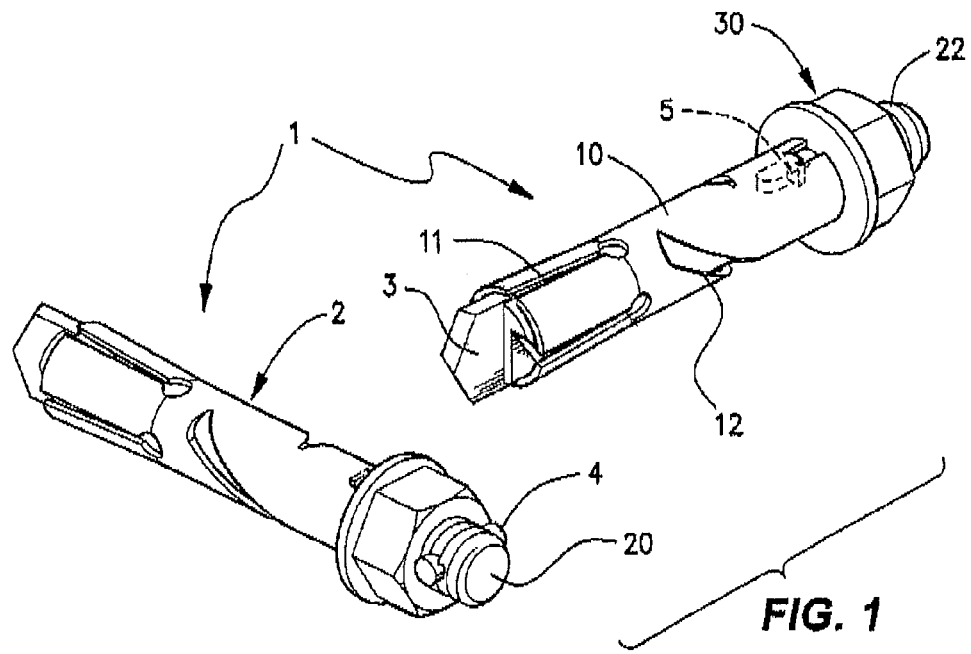
FIG. 1 shows perspective views of the self-drilling masonry bolt according to a preferred embodiment of the invention.
Figure 2:
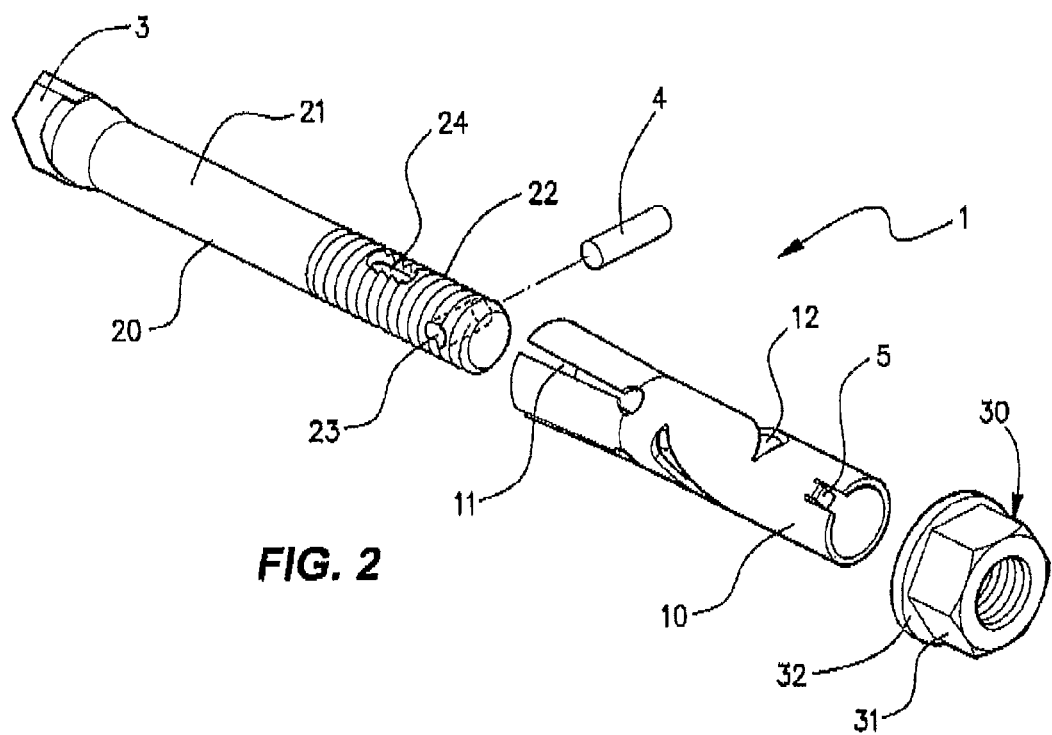
FIG. 2 shows an exploded view of the self-drilling masonry bolt according to a preferred embodiment of the invention.
Figures 3, 4:
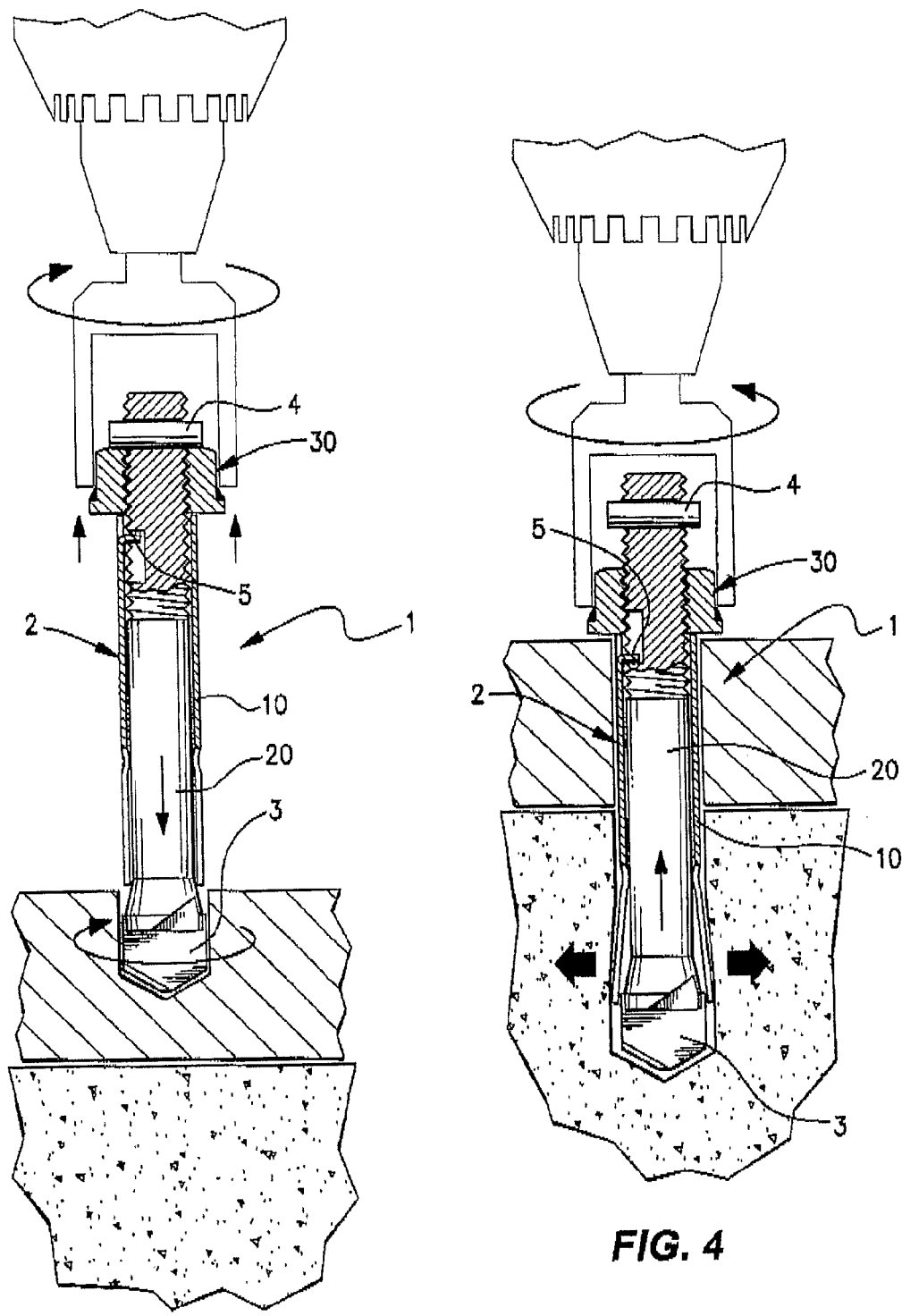
FIG. 3 shows the self-drilling masonry bolt being drilling into a masonry material in a conventional direction according to a preferred embodiment of the invention.
FIG. 4 shows the self-drilling masonry bolt being drilled in reverse according to a preferred embodiment of the invention, to draw the threaded bolt upwardly through the sleeve portion, expanding the sleeve portion to anchor the bolt in place.

FIGS. 1 to 4 show the self-drilling masonry bolt according to a preferred embodiment of the invention.

The invention provides a self-drilling masonry bolt 1 which provides a simple and effective means for securing an item to cement and/or wood without the requirement of multiple tools. The self-drilling masonry bolt 1 is adapted for use with masonry materials such as concrete, brickwork, stoneware or rock or the like, and the securing of these materials to concrete, wood or any other suitable material. The self-drilling masonry bolt 1 is adapted to be made of a metal material which is strong, durable and resistant to corrosion. It is envisaged that the shape, style and dimensions of the self-drilling masonry bolt 1 and its components may be varied as required to suit different materials and/or applications.

The self-drilling masonry bolt 1 has provided a body portion 2. The body portion 2 includes an outer sleeve portion 10 and a partially threaded bolt member 20 therein. The sleeve portion 10 is in the form of a hollow circular expansion sleeve which is adapted to expand and secure/anchor the bolt 1 within a drilled hole and/or material. The diameter of the sleeve portion 10 is adapted to be slightly larger than the diameter of the threaded bolt 20 so that the sleeve portion 10 can be positioned over and receive the threaded bolt 20 therethrough. The length of the sleeve portion 10 is adapted to substantially cover the shank 21 of the bolt member 20 positioned therein whereby, an upper end of the sleeve portion 10 is adapted to be connected beneath, or abut against, a head portion 30 of the bolt 1 and a lower end is adapted to end at a prescribed point above a drilling tip 3 of the bolt 1.

The sleeve portion 10 has at least one split 11 which is adapted to enable the sleeve portion 10 to expand. In a preferred embodiment, the sleeve portion 10 preferably has provided four splits 11 which are adapted to extend partially along the length of the lower end of the sleeve portion 10. The split 11 is similar in shape to a keyhole shape having a circular aperture at the top of the split 11 with split extending downwardly to the bottom edge of the sleeve portion 10, and the split tapering outwardly at the bottom end of the sleeve portion 10. The tapering of the split 11 is adapted to allow the sleeve portion 10 to expand.

The sleeve portion 10 has provided at least one helical rotor/radial cut-out portion 12. The helical rotor/radial cut-out portion(s) 12 is/are adapted to be in the form of elongated cut-out portions which curve partially around the circumference of the sleeve portion 10. The helical rotor/radial cut-out portion(s) 12 is/are function to clean and pull debris out of a hole being drilled. It is envisaged that the shape and dimensions of the helical rotor/radial cut-out portion(s) 12 may vary to suit the material being drilled and/or cleaning of the hole.

The body portion 2 of the self-drilling masonry bolt 1 preferably has provided a partially threaded bolt member 20 which is adapted to be received within the outer sleeve 10 of the body portion 2. The bolt member includes a shank 21, a head portion 30 and a drilling tip 3. The bolt member 20 preferably has provided an upper end and a lower end. The bolt member 20 is preferably tapered so that the lower end of the bolt member 20 is preferably larger in diameter than the upper end. This is designed to ensure that the outer sleeve 10 will be able to fit within the hole that the drilling tip 3 has created. The upper end of the bolt member 20 is adapted to have a threaded portion 22 so that a nut and/or washer can be received and tightened thereon in order to draw the bolt back up through the outer sleeve 10. The threaded portion 22 preferably has provided a left-handed thread for use with a reverse gear drill.

The threaded portion 22 has provided at least one aperture. The aperture(s) is/are preferably adapted to be circular in shape. However, it is envisaged that any other suitable shape may also be employed. A first aperture 23 is preferably adapted to extend horizontally through the entire width of the shank 21 of the bolt member 20. A second aperture 24 is adapted to be provided on one side of the threaded bolt 20 and only extend through said side of the threaded bolt 20.

Provided at the upper end of the self-drilling masonry bolt 1 is a head portion 30. The head portion 30 preferably comprises a nut 31 and a washer 32. However, it is envisaged that any other type of head type such as countersunk, flat head, round head, flanged head or flush head or the like may also be adopted. It is further envisaged that these other head types may be relevant to other building applications such as hook bolts, eye bolts or the like and consequently, be adopted as a preferred option. In a preferred embodiment, the nut 31 and washer 32 are adapted to be connected to each other via welding or any other suitable means. In a further embodiment, it is envisaged that the nut 31 and washer 32 could be integrally formed with each other. The nut 31 is in the form of a hexagonal nut or any other suitable shaped nut. The washer 32 is in the form of a flat circular-shaped disc. The underside of the washer 32 is preferably pleated so that the washer 32 can brush away the debris as it comes up to the surface during drilling of the hole.

In an alternate embodiment of the invention, the nut 31 and washer 32 may be provided as separate components. In this embodiment, a stopper (not shown) may be provided at the upper end of the bolt member 20 as an alternative to the pin member 4 which is adapted to pass through the threaded portion 22 of the bolt member 20. The stopper preferably comprises a flat washer having a half-pin member moulded to the underside of the washer. The moulded half-pin member may be adapted to be passed through the bolt member 20 so that either side of the half-pin member protrudes from either side of the bolt member 20. The stopper is preferably secured to the top end of the self-drilling masonry bolt 1 via welding and/or any other suitable securing means.

The self-drilling masonry bolt 1 has provided at least one pin member. A first pin member 4 or the like is adapted to be passed through the aperture 23 in the threaded portion 22 of the bolt member 20 so that either end of the pin member 4 protrudes outwardly on either side of the bolt 1 in order to secure a head portion 30 located therebeneath and prevent the head portion 30 coming away from the bolt 20. A second pin-like member 5 is provided on the upper portion of the body portion 2 of the bolt. The second pin member 5 is preferably adapted to be integrally formed with the sleeve portion 10 and is adapted to bend inwardly into the centre of the sleeve portion 10. When the sleeve portion 10 is located over the threaded bolt 20 the pin member 5 is adapted to be received within the aperture 24 in the threaded bolt 20 such that, it holds the sleeve portion 10 in place as the bolt member 20 is drawn back up through the sleeve portion 20 to move the bent portion of the pin, and expand the splits 11 of the sleeve portion 10, so that the bolt 1 is locked into place within the hole.

The lower end of the self-drilling masonry bolt 1 comprises a drilling tip 3 which is adapted to be integrally formed with the lower thicker end of the threaded bolt member 20 of the bolt. The drilling tip 3 may preferably have any profile suitable for drilling through masonry materials. It is envisaged that the drilling tip 3 can be made from the same or different material to the shank 21 of the threaded bolt 20 of the self-drilling masonry bolt 1. In a further embodiment of the invention, the lower end of the bolt is preferably provided with a small cam (not shown) or the like which is adapted to engage with the sleeve portion 10 in order to rotate the sleeve portion 10 in synchronisation with the rotation of the bolt 1 during drilling in order to extract the debris, created as a result of the drilling process, via the helical rotor/radial cut-out portions.

The self-drilling masonry bolt 1 is preferably adapted to be used with an electric drill that is fitted with a reverse gear. In practice, the self-drilling masonry bolt 1 is drilled in a conventional direction to a full depth where the bottom of the head portion 30 is in contact with the surface of the material. The drill in then engaged into reverse. This action tightens the nut 31 on the bolt 1 and expands the splits 11 on the lower end of the sleeve portion 10, by pulling the internal bolt 20 upwardly through the sleeve portion 10, in order to secure the self-drilling masonry bolt 1 within the hole. Accordingly, the self-drilling masonry bolt 1 of the invention eradicates the need for multiple tools. However, it is envisaged that the invention may also be used with an electric drill which is not fitted with a reverse gear, in which case the nut/head portion 30 may be tightened by hand or with a spanner or other suitable tool.

While we have described herein a particular embodiment of a self-drilling masonry bolt 1, it is further envisaged that other embodiments of the invention could exhibit any number and combination of any one of the features previously described. However, it is to be understood that any variations and modifications can be made without departing from the spirit and scope thereof.

We claim:

1. A self-drilling masonry bolt comprising:
   a body portion having a bolt member and an outer sleeve portion;
   a head portion; and
   a drilling tip whereby the self-drilling masonry bolt provides a simple and effective means for securing an item to cement, wood or any other suitable material without the requirement of multiple tools; wherein:
      the bolt member comprises a shank, the head portion and the drilling tip;
      an upper end of the bolt member comprises a threaded portion; and
      the threaded portion comprises at least one aperture.

2. The self-drilling masonry bolt of claim 1 wherein the sleeve portion comprises a hollow circular expansion sleeve adapted to expand thereby securing the bolt within at least one of a drilled hole and a material.

3. The self-drilling masonry bolt of claim 1 wherein a diameter of the sleeve portion is slightly larger than a diameter of a threaded portion of the bolt member so that the sleeve portion is adapted to be positioned over and receive the threaded portion of the bolt therethrough.

4. The self-drilling masonry bolt of claim 1 wherein the sleeve portion comprises at least one split which enables the sleeve portion to expand.

5. The self-drilling masonry bolt of claim 4 wherein:
   each split of the at least one split comprises a circular aperture at a top of the split with the split extending downwardly to a bottom edge of the sleeve portion; and
   each split tapers outwardly at the bottom edge of the sleeve portion.

6. The self-drilling masonry bolt of claim 1 wherein:
   the sleeve portion comprises at least one helical cut-out portion that curves partially around a circumference of the sleeve portion; and
   the helical cut-out portion operates to clean and pull debris out of a hole during drilling.

7. The self-drilling masonry bolt of claim 1 wherein the bolt is tapered so that a lower end of the bolt is larger in diameter than an upper end of the bolt.

8. The self-drilling masonry bolt of claim 1 wherein the at last one aperture comprises:
   a first aperture that extends horizontally through an entire width of the shank of the bolt member; and
   a second aperture positioned on one side of the threaded portion of the bolt; wherein:
      the second aperture only partially extends into the side of the threaded portion of the bolt.

9. The self-drilling masonry bolt of claim 1 wherein the head portion comprises a nut and a washer.

10. The self-drilling masonry bolt of claim 9 wherein an underside of the washer is pleated.

11. The self-drilling masonry bolt of claim 1 wherein the drilling tip is adapted to be integrally formed with a lower thicker end of the bolt member.

12. A self-drilling masonry bolt comprising:
    a body portion having a bolt member and an outer sleeve portion;
    a head portion; and
    a drilling tip whereby the self-drilling masonry bolt provides a simple and effective means for securing an item to cement, wood or any other suitable material without the requirement of multiple tools; and
    at least one pin member connecting the sleeve portion and the bolt member.

13. The self-drilling masonry bolt of claim 12 wherein the at least one pin member comprises first and second pin members, wherein the first pin member passes through an aperture in a threaded portion of the bolt member so that either end of the first pin member protrudes outwardly on either side of the bolt, and wherein the second pin connects the sleeve and bolt.

14. The self-drilling masonry bolt of claim 13 wherein the second pin member is on an upper portion of the body portion; wherein the second pin member is adapted to be integrally formed with the sleeve portion and bend inwardly into a center of the sleeve portion.

15. A self-drilling fastener for fastening to a material without using multiple tools, the fastener comprising:
    a bolt having a tip and a threaded portion, the threaded portion having a first aperture therethrough;
    a sleeve having at least one split; and
    a first pin; wherein:
       the sleeve is moveably positioned around the bolt;
       the first pin is positioned in the first aperture;
       a first end of the first pin protrudes outwardly from a first side of the bolt;
       a second end of the first pin protrudes outwardly from a second side of the bolt;
       the tip is adapted to drill a hole in the material; and
       the at least one split is adapted to expand the sleeve while the sleeve is positioned in the hole to secure the fastener to the material.

16. The self-drilling masonry fastener of claim 15 wherein:
    the bolt further comprises a second aperture;
    the sleeve comprises a second pin; wherein:
       the second aperture receives the second pin while the sleeve is positioned over the threaded portion whereby the second pin holds the sleeve in place while the bolt moves within the sleeve to expand the at least one split.

17. The self-drilling masonry fastener of claim 16 wherein:
    the bolt further comprises a head;
    the head comprises a nut and a washer; wherein:
       an underside of the washer is pleated.

18. The self-drilling masonry fastener of claim 17 wherein:
    the second pin is adapted to be integrally formed with the sleeve and bend inwardly into a center of the sleeve;
    the second aperture is an elongate groove; and
    the second pin holds the sleeve in place through movement of the second pin longitudinally inside the elongate groove.

19. The self-drilling masonry fastener of claim 18 wherein:
    the nut is positioned between the first pin and the sleeve and the pleated washer is positioned between the nut and the sleeve;
    the nut is threadedly engaged with the threaded portion;
    rotational movement of the nut when used in a first direction causes the nut to move along the threaded portion until engagement of the nut with the first pin so that further rotational movement of the nut causes rotational movement of the bolt also in the first direction; and rotational movement of the nut when used in a second, opposite direction causes the nut to move away from the first pin towards the sleeve so that further rotational movement of the nut causes engagement of the pleated washer with the sleeve thereby causing the tip to be pulled into the sleeve to cause expansioning of the sleeve.

20. The self-drilling masonry fastener of claim 19 wherein:

the nut during installation is connected to a drilling machine;

the first direction is clockwise and the second direction is anticlockwise;

a screw thread of the threaded portion is a left-handed screw thread; and the clockwise rotation of the nut with the drilling machine causes the nut to engage with the first pin thereby allowing the tip of the bolt to be drilled into the material with the drilling machine.

* * * * *